United States Patent
Kim et al.

(10) Patent No.: US 11,422,738 B2
(45) Date of Patent: Aug. 23, 2022

(54) DATA STORAGE DEVICE, METHOD OF OPERATING THE SAME, AND STORAGE SYSTEM HAVING THE SAME

(71) Applicant: SK hynix Inc., Icheon-si (KR)

(72) Inventors: Hyung Min Kim, Icheon-si (KR); Do Hun Kim, Hwaseong-si (KR); Jae Han Park, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 542 days.

(21) Appl. No.: 16/513,045

(22) Filed: Jul. 16, 2019

(65) Prior Publication Data
US 2020/0150895 A1    May 14, 2020

(30) Foreign Application Priority Data
Nov. 12, 2018  (KR) .................. 10-2018-0137905

(51) Int. Cl.
G06F 12/00     (2006.01)
G06F 3/06      (2006.01)
G06F 12/0802   (2016.01)

(52) U.S. Cl.
CPC .......... *G06F 3/0656* (2013.01); *G06F 3/0623* (2013.01); *G06F 3/0679* (2013.01); *G06F 12/0802* (2013.01); *G06F 2212/1024* (2013.01); *G06F 2212/402* (2013.01); *G06F 2212/6022* (2013.01); *G06F 2212/7203* (2013.01)

(58) Field of Classification Search
CPC .... G06F 3/0656; G06F 3/0623; G06F 3/0679; G06F 12/0802; G06F 2212/1024; G06F 2212/402; G06F 2212/6022; G06F 2212/7203
See application file for complete search history.

(56) References Cited

U.S. PATENT DOCUMENTS

| | | | |
|---|---|---|---|
| 2006/0195704 A1* | 8/2006 | Cochran | G06F 11/2089 713/193 |
| 2011/0122982 A1* | 5/2011 | Yun | G06F 13/405 375/362 |
| 2011/0145680 A1* | 6/2011 | Akiyama | G11B 20/0021 714/E11.034 |
| 2012/0137139 A1* | 5/2012 | Kudoh | H04L 9/10 713/189 |
| 2014/0149775 A1* | 5/2014 | Ware | G06F 1/3287 713/323 |
| 2014/0337598 A1* | 11/2014 | Rao | G06F 3/0613 711/167 |

FOREIGN PATENT DOCUMENTS

| KR | 1020080023595 A | 3/2008 |
|---|---|---|
| KR | 100874692 B1 | 12/2008 |

* cited by examiner

*Primary Examiner* — Gurtej Bansal
(74) *Attorney, Agent, or Firm* — William Park & Associates Ltd.

(57) ABSTRACT

A data storage device includes a storage, a buffer memory, and a controller. The controller is configured to control at least one of an input of data to and an output of data from the storage in response to a request transmitted from a host device. The controller is also configured to receive write data transmitted from the host device and cached in the buffer memory, encrypt the write data, and store the encrypted write data in the storage. The controller is further configured to receive read data read from the storage and cached in the buffer memory, decrypt the read data, and provide the decrypted read data to the host device.

20 Claims, 9 Drawing Sheets

DATA STORAGE DEVICE, METHOD OF OPERATING THE SAME, AND STORAGE SYSTEM HAVING THE SAME

CROSS-REFERENCES TO RELATED APPLICATION

The present application claims priority under 35 U.S.C. § 119(a) to Korean application number 10-2018-0137905, filed on Nov. 12, 2018, in the Korean Intellectual Property Office, which is incorporated herein by reference in its entirety.

BACKGROUND

1. Technical Field

Various embodiments generally relate to an integrated semiconductor device, and more particularly, to a data storage device, a method of operating a data storage device, and a storage system including a data storage device.

2. Related Art

The fields of application for data storage devices are becoming increasingly diversified. At the same time, the demand and importance of security with regard to stored data is also increasing. Hence, security techniques for allowing only an authorized user to access data stored in a storage medium encompassing not only a large storage medium for business purposes but also a personal storage medium for private purposes are being studied. Ideally, such security techniques prevent data from being changed, deleted, or leaked as a consequence of unapproved access.

For data security, data may be encrypted before being stored in a storage medium, and data read from the storage medium may be decrypted before being provided to a user. Encryption and decryption of data inputted and outputted, respectively, from a storage medium is closely related to the performance of a system including the storage medium.

SUMMARY

In an embodiment, a data storage device may include a storage, a buffer memory, and a controller. The controller is configured to control at least one of an input of data to and an output of data from the storage in response to a request transmitted from a host device. The controller is also configured to receive write data transmitted from the host device and cached in the buffer memory, encrypt the write data, and store the encrypted write data in the storage. The controller is further configured to receive read data read from the storage and cached in the buffer memory, decrypt the read data, and provide the decrypted read data to the host device.

In an embodiment, a data storage device may include a storage, a buffer memory, and a controller. The controller is configured to allow plaintext write data to be cached in a plaintext format in the buffer memory through a host device, receive the plaintext write data from the buffer memory, and encrypt the plaintext write data. The controller is further configured to allow read data to be cached in an encrypted state in the buffer memory through the storage, receive the encrypted read data from the buffer memory, decrypt the encrypted read data, and transmit the decrypted read data to the host device.

In an embodiment, a method of operating a data storage device including a storage, a buffer memory, and a controller configured to control at least one of an input of data to and an output of data from the storage in response to a request transmitted from a host device includes receiving, by the controller, write data transmitted from the host device and cached in the buffer memory, encrypting the write data, and storing the encrypted write data in the storage. The method also includes receiving, by the controller, read data read from the storage and cached in the buffer memory, decrypting the read data, and providing the decrypted read data to the host device.

In an embodiment, a data storage system may include a host device and a data storage device including a storage, a buffer memory, and a controller. The controller is configured to control at least one of an input of data to and an output of data from the storage in response to a request transmitted from the host device. The controller may receive write data transmitted from the host device and cached in the buffer memory, encrypt the write data, and store the encrypted write data in the storage. The controller may also receive read data read from the storage and cached in the buffer memory, decrypt the read data, and provide the decrypted read data to the host device.

DETAILED DESCRIPTION

Hereinafter, a limited number of possible embodiments for the present disclosure are described in detail with reference to the accompanying drawings.

Figure 1:
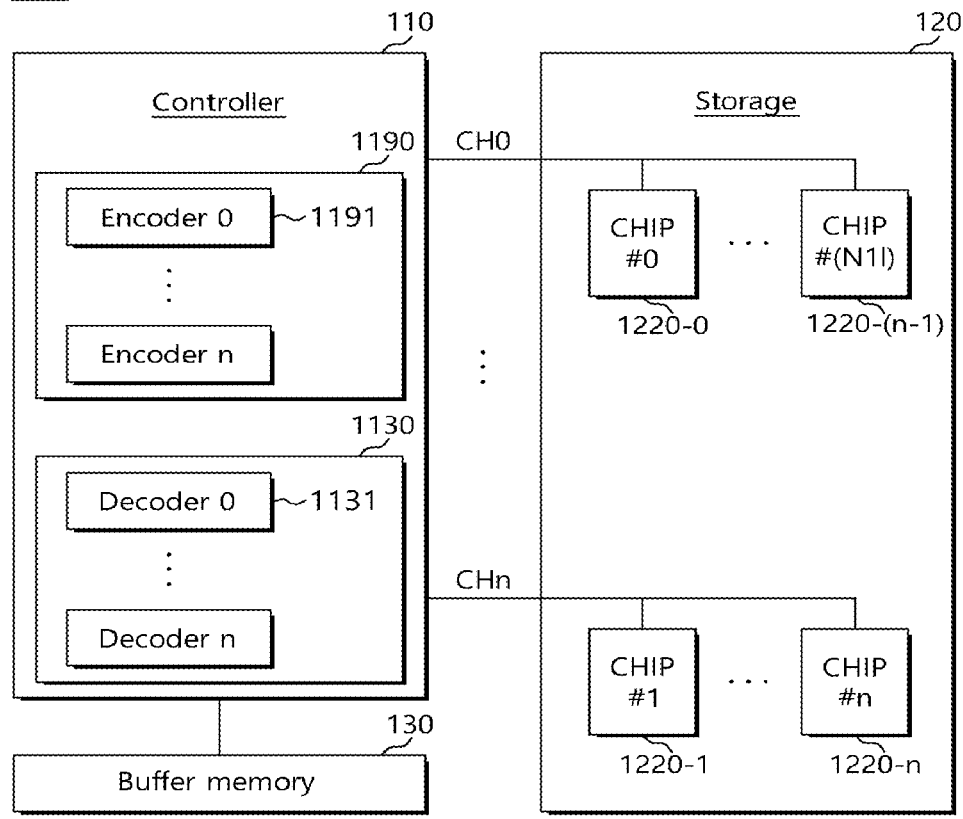
FIG. 1 shows a diagram illustrating a configuration of a data storage device, in accordance with an embodiment.

FIG. 1 shows a diagram illustrating a configuration of a data storage device 10, in accordance with an embodiment.

Referring to FIG. 1, the data storage device 10 may include a controller 110, a storage 120, and a buffer memory 130.

The controller 110 may control the storage 120 in response to a request of a host device. For example, the controller 110 may allow data to be programmed to the storage 120 in response to a program (write) request from the host device. Furthermore, the controller 110 may provide data stored in the storage 120 to the host device in response to a read request from the host device.

The storage 120 may store data or output stored data under control of the controller 110. The storage 120 may be configured as a volatile or nonvolatile memory device. In an embodiment, the storage 120 may be embodied using a memory element selected from among various nonvolatile memory elements, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin torque transfer magnetic RAM (STT-MRAM). The storage 120 may include a plurality of memory devices 1220-0 to 1220-n each of which includes a plurality of dies Die 0 to Die n, a plurality of chips, or a plurality of packages. Each of the plurality of memory devices 1220-0 to 1220-n may be coupled with the controller 110 through a corresponding channel of a plurality of channels CH0 to CHn. Each of the channels CH0 to CHn may be coupled with one or more memory devices. Memory devices coupled to each channel may be coupled to the same signal bus and the same data bus.

The storage 120 may be formed of single-level cells, each capable of storing one-bit data, or multi-level cells, each capable of storing multi-bit data.

The buffer memory 130 functions as a storage space capable of temporarily storing data when the data storage device 10 performs a series of operations including, e.g., an operation of writing or reading data, in conjunction with the host device. Although FIG. 1 illustrates that the buffer memory 130 is disposed outside the controller 110, the buffer memory 130 may be provided inside the controller 110.

Figure 2:
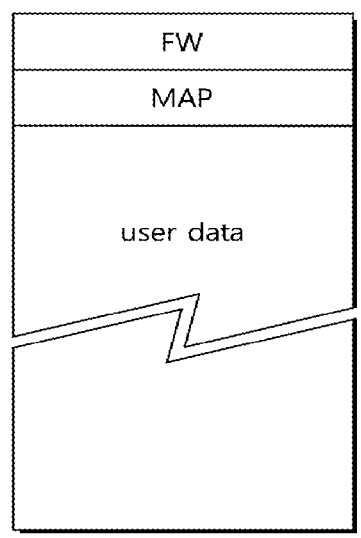
FIG. 2 shows a diagram illustrating a configuration of a memory device, in accordance with an embodiment.

FIG. 2 shows a diagram illustrating a configuration of a memory device 1220 among the memory devices 1220-0 to 1220-n.

Each of the plurality of memory devices 1220-0 to 1220-n may be divided into a firmware code storage area FW, a map data storage area MAP, and a user data storage area User data. A firmware code and map data may be collectively called system data.

The firmware code storage area FW provided to store a firmware code (a binary file), which is a program code for managing the storage 120, and the map data storage area MAP provided to store map data, which is mapping information between a logical address to be managed by the host device and a physical address in the storage 120, may be areas with security and integrity such that they are inaccessible to a user.

User data provided from the host device may be stored in the user data storage area User data.

During a write operation, data provided from the host device may be cached in the buffer memory 130 through the controller 110 and thereafter written to the memory devices 1220-0 to 1220-n. During a read operation, data read from the memory devices 1220-0 to 1220-n may be cached in the buffer memory 130 and thereafter provided to the host device through the controller 110.

The controller 110, in accordance with an embodiment of the present disclosure, may include an encryption circuit 1190 including at least one encoder 1191, and a decryption circuit 1130 including at least one decoder 1131. In an embodiment, the encryption circuit 1190 may be provided in a memory interface controller, which provides a communication channel for signal exchange between the controller 110 and the storage 120. The decryption circuit 1130 may be provided in a host interface controller, which provides a communication channel between the host device and the data storage device 10. Detailed descriptions of the memory interface controller and the host interface controller are described below with reference to FIG. 3.

In the case where the encryption circuit 1190 and the decryption circuit 1130, respectively, include a plurality of encoders 1191 and a plurality of decoders 1131, maximum throughput may be provided as the plurality of encoders 1191 and the plurality of decoders 1131 are operated in parallel. In the case where the encryption circuit 1190 includes the plurality of encoders 1191 which are operated in parallel, the plurality of channels CH0 to CHn may share the single encryption circuit 1190, so that the size of the data storage device 10 may be minimized.

Furthermore, as each encoder 1191 processes an encryption process in a pipeline scheme, operation latency may be minimized.

In an embodiment, a bandwidth of the encryption circuit 1190 may synchronize with a bandwidth of the storage 120. A bandwidth of the decryption circuit 1130 may synchronize with a bandwidth of the host device.

In an embodiment, if the absolute value of a difference between the bandwidth of the host device and the bandwidth of the storage 120 is less than a preset reference value, the bandwidths of the encryption circuit 1190 and the decryption circuit 1130 may synchronize with the bandwidth of the host device.

The word "preset" as used herein with respect to a parameter, such as a preset reference value, a preset chunk basis, and a preset condition, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

In an embodiment, if the bandwidth of the storage 120 is greater than the bandwidth of the host device by a preset reference value or more, an operation timing mismatch situation due to a difference in bandwidth may be overcome by buffering encrypted data to a buffer, which may be provided in the memory interface controller, and then outputting the encrypted data to the storage 120.

In an embodiment, the encryption circuit 1190 may be configured to receive write data cached in the buffer memory 130 from the host device, encrypt the write data, and store the encrypted write data in the storage 120. The decryption circuit 1130 may be configured to receive read data read from the storage 120 and cached in the buffer memory 130, decrypt the read data, and provide the decrypted read data to the host device. Here, the write data may be divided into chunks, which are preset size units, and cached in the buffer memory 130. The encryption circuit 1130 may encrypt the write data on a chunk basis. The write data divided into the chunks each may be encrypted in parallel in a plurality of encoders.

In another embodiment, the controller 110 may be configured such that write data is cached in a plaintext format in the buffer memory 130 through the host device and, if the encryption circuit 1190 receives and encrypts the plaintext write data, the encrypted write data is stored in the storage 120. Also, the controller 110 may be configured such that read data is cached in an encrypted state in the buffer memory 130 through the storage 120 and, if the decryption circuit 1130 receives and decrypts the encrypted read data, the decrypted read data is transmitted to the host device.

In another embodiment, the encryption circuit 1190 may encrypt write data immediately before storing the write data in the storage 120. The decryption circuit 1130 may decrypt read data immediately before transmitting the read data to the host device.

Data such as map data that is generated in the controller 110 rather than being provided from the host device may also be temporarily stored in the buffer memory 130, and thereafter encrypted by the encryption circuit 1190 and then stored in the storage 120.

On the one hand, during an operation of booting the data storage device 10, system data including map data and firmware codes may be read in an encrypted state from the storage 120 and loaded into the buffer memory 130. The system data loaded into the buffer memory 130 may be transmitted to and decrypted by the decryption circuit 1130 and thereafter stored in an internal memory of the controller 110 to provide information needed for an operation of the data storage device 10.

Figure 3:
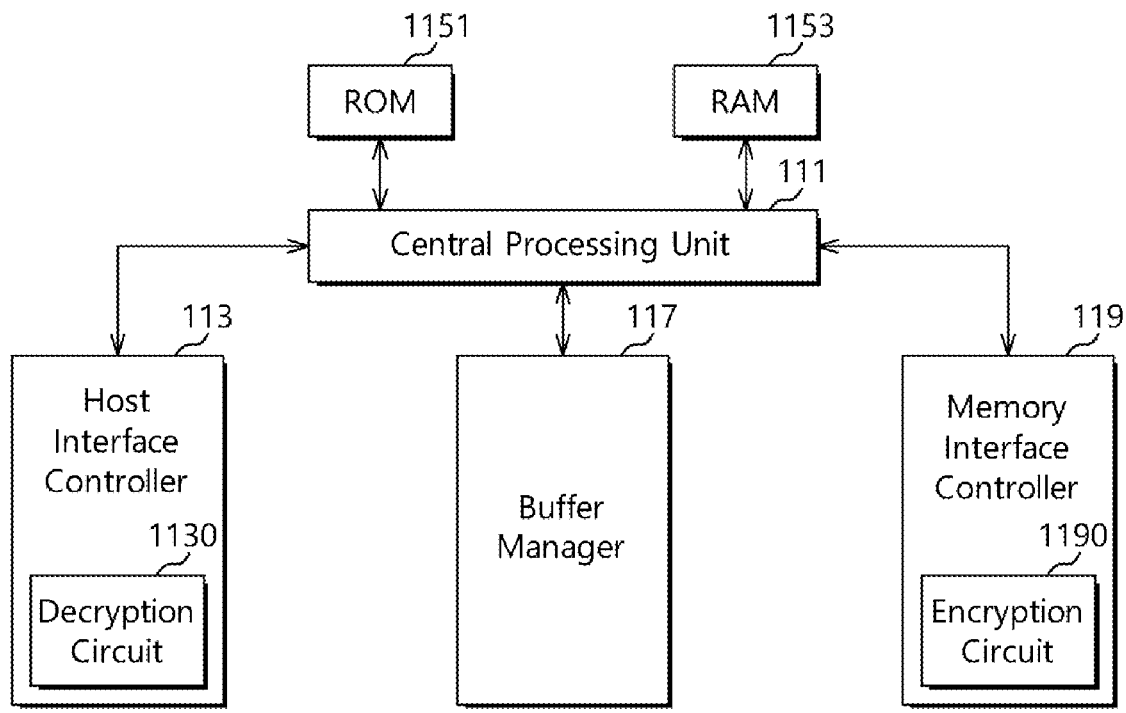
FIG. 3 shows a diagram illustrating a configuration of a controller, in accordance with an embodiment.

FIG. 3 shows a diagram illustrating a configuration of the controller in accordance with an embodiment.

Referring to FIG. 3, the controller 110, in accordance with an embodiment, may include a central processing unit 111, a host interface controller (HIL) 113, a ROM 1151, a RAM 1153, a buffer manager 117, and a memory interface controller (FIL) 119.

The central processing unit 111 may be configured to transmit various control information needed for a data read or write operation for the storage 120 to the host interface controller 113, the RAM 1153, the buffer manager 117, and the memory interface controller 119. In an embodiment, the central processing unit 111 may be operated according to firmware provided for various operations of the data storage device 10. The firmware may be stored in the storage 120, and loaded into the RAM 1153 of the controller 110 during an operation of booting the data storage device 10.

In an embodiment, the central processing unit 111 may perform the function of a flash translation layer (FTL) for performing a garbage collection operation, an address mapping operation, a wear leveling operation, etc. for managing the storage 120, an error check and correction (ECC) function of detecting and correcting an error in data read out from the storage 120, and so forth.

The host interface controller 113 may provide a communication channel configured to receive a command and a clock signal from the host device and control input or output of data under control of the central processing unit 111. Particularly, the host interface controller 113 may provide physical connection between the host device and the data storage device 10. Furthermore, the host interface controller 113 may provide interfacing with the data storage device 10 in correspondence with a bus format of the host device. The bus format of the host device may include at least one of standard interface protocols, such as a secure digital protocol, a universal serial bus (USB) protocol, a multi-media card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI express (PCI-E) protocol, a universal flash storage (UFS) protocol, and so forth.

The host interface controller 113 may include the decryption circuit 1130 including at least one decoder 1131. The decryption circuit 1130 may receive and decrypt encrypted data read from the storage 120 and cached in the buffer memory 130. The encrypted data read from the storage 120 may be user data or system data (e.g., map data, a firmware code, etc.).

The ROM 1151 may store program codes needed for the operation of the controller 110, for example, firmware or software, code data to be used by program codes, and so forth.

The RAM 1153 may store data needed for the operation of the controller 110 or data generated by the controller 110.

The central processing unit 111 may load a boot code stored in the storage 120 or the ROM 1151 into the RAM 1153 during the operation of booting the data storage device 10, thus controlling the booting operation.

The buffer manager 117 may be configured to manage a use state of the buffer memory 130. In an embodiment, the buffer manager 117 may divide the buffer memory 130 into a plurality of areas (slots) and allocate each area for temporarily storing data or deallocate each area. The term "allocating an area" may mean that data is stored in the corresponding area, or data stored in the corresponding area is valid. The term "deallocating an area" may mean that no data is stored in the corresponding area, or data stored in the corresponding area is invalid.

The memory interface controller 119 may provide a communication channel for signal exchange between the controller 110 and the storage 120. The memory interface controller 119 may write data temporarily stored in the buffer memory 130 to the storage 120 under control of the central processing unit 111. In addition, the memory interface controller 119 may transmit data read out from the storage 120 to the buffer memory 130 to temporarily store the data.

The memory interface controller 119 may include the encryption circuit 1190 including at least one encoder 1191. The encryption circuit 1190 may receive and decrypt encrypted data provided from the host device and cached in the buffer memory 130, or system data self-generated in the controller 110 during the operation of the data storage device 10. In an embodiment, data of the host device may be cached in the buffer memory 130 in units of chunks divided on a predetermined unit basis. The encryption circuit 1190 may encrypt the data in units of chunks. In the case where the encryption circuit 1190 includes a plurality of encoders, the encryption circuit 1190 may encrypt a plurality of data chunks in parallel.

Write data provided from the host device may be user data, or firmware update information. System data self-generated from the controller 110 may be, for example, map data.

In an embodiment, the encryption circuit 1190 and the decryption circuit 1130 may employ an encryption algorithm selected from among block encryption algorithms, such as a data encryption standard (DES) algorithm, a 3DES algorithm, an advanced encryption standard (AES) algorithm, and a SEED algorithm, but the present disclosure is not limited thereto.

Figure 4A:
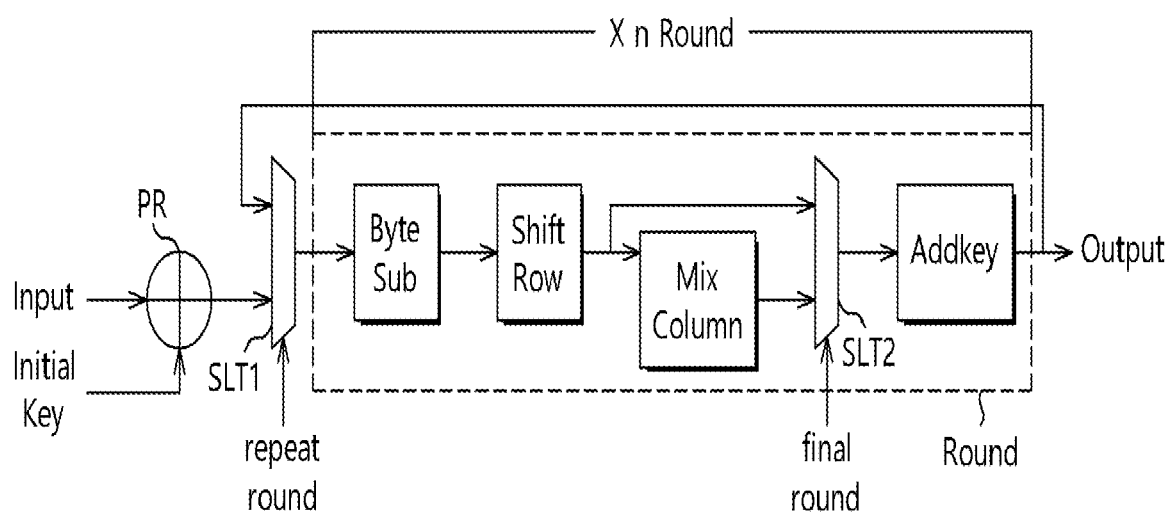
FIGS. 4A and 4B show diagrams for describing a scheme for encryption, in accordance with an embodiment.
Figure 4B:
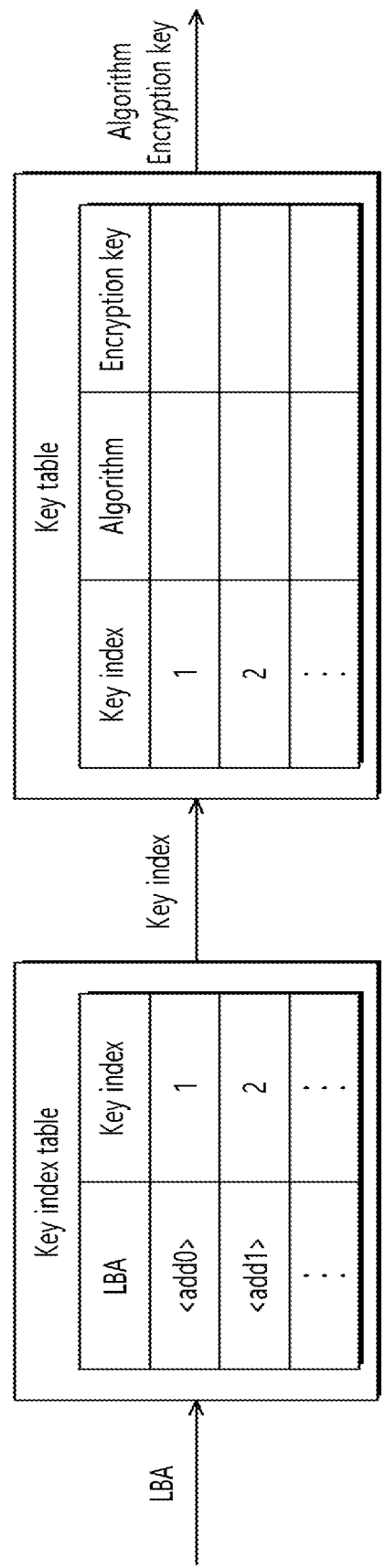

FIGS. 4A and 4B show diagrams for describing a scheme for encryption, in accordance with an embodiment.

FIG. 4A shows a diagram for describing an encryption method in accordance with an embodiment, and illustrates an AES-based encryption algorithm.

Referring to FIG. 4A, the encoder 1191 may include a pre-round PR and N rounds Round×n.

In the pre-round PR, a logical combination of plaintext data Input with an initial round key Initial key may be performed. The initial round key may be the same key as an encryption key. Either output data of the pre-round PR or data generated as a result of executing each round Round may be selected by a first selection circuit SLT1 and provided as input data of a subsequent round.

In each round Round, a confusion operation and a diffusion operation may be performed on an input signal (an encryption operation result of a previous round), and thereafter the input signal may be combined with an intrinsic round key of the each round. The confusion operation means confusing a relationship between data blocks of successive rounds. The diffusion operation means diffusing patterns of a data block.

Each round may include a substitution circuit Byte Sub, a diffusion circuit Shift Row, a mixing circuit Mix Column, a round determination circuit SLT2, and a combination circuit Add key. For an embodiment, the last round does not include the mixing circuit Mix Column.

The substitution circuit Byte Sub may scramble bytes of the data block such that the input data does not have a linear structure.

The diffusion circuit Shift Row may be configured to shift each row of the data block by a certain number.

The mixing circuit Mix Column may mix elements of each column of the data block.

The confusion operation and the diffusion operation may be performed on the input data by the substitution circuit, the diffusion circuit, and the mixing circuit.

The combination circuit Add key may combine the elements (bytes) of the data block with the round key, for example, through an XOR logic operation.

In addition, the decryption operation may be an operation which inversely performs the encryption operation of FIG. 4A.

As described above, the encryption key is used in the encryption and decryption operations. Keys to be used for the encryption and decryption operations may, for an embodiment, be selectively stored in any storage space so long as reliable supply of power to the storage space is ensured.

To provide the encryption key to the encoder 1191 or the decoder 1131, a key management table may be used.

FIG. 4B shows a diagram illustrating an example of a key management table.

Referring to FIG. 4B, the key management table may include a key index table and a key table. The key management table may be stored in a space selected from a storage space in which a supply of power is maintained, and may be configured to be accessible to the encoder 1191 and the decoder 1131.

The key index table may store information about logical address information LBA and key indexes corresponding to the logical address information LBA.

As logical address information is provided to the key index table, a key index corresponding thereto may be outputted.

The key table may store information about encryption algorithms and encryption keys for the respective key indexes. As a key index corresponding to logical address information LBA is extracted from the key index table, an algorithm and an encryption key that corresponds to the key index may be provided from the key table. The encoder 1191 or the decoder 1131 may encrypt or decrypt data based on the algorithm and the encryption key that are provided from the key table.

An encryption algorithm, i.e., an encryption mode, of the AES may be selected from among an XTS mode (referred to as an xor-encrypt-xor (XEX) encryption mode with tweak and ciphertext stealing or an XEX-based tweaked-codebook mode with ciphertext stealing), an electronic code block (ECB) mode, a cipher block chaining (CBC) mode, a cipher feedback (CFB) mode, an output feedback (OFB) mode, and a counter (CTR) mode, but it is not limited to these modes.

In an embodiment, a logical or physical space of the data storage device 10 may be divided into partitions, which are a plurality of virtual spaces. Different encryption algorithms and encryption keys may be used for the respective partitions.

Regardless of the encryption mode to be used and the configuration employed as the encryption circuit and the decryption circuit, the user data or the system data may be transmitted in a plaintext format to the memory interface controller, encrypted by the encryption circuit, and stored in the storage 120. Furthermore, data read from the storage 120 may be transmitted in an encrypted state to the host interface controller, decrypted by the decryption circuit, and transmitted to the host device.

Figure 5:
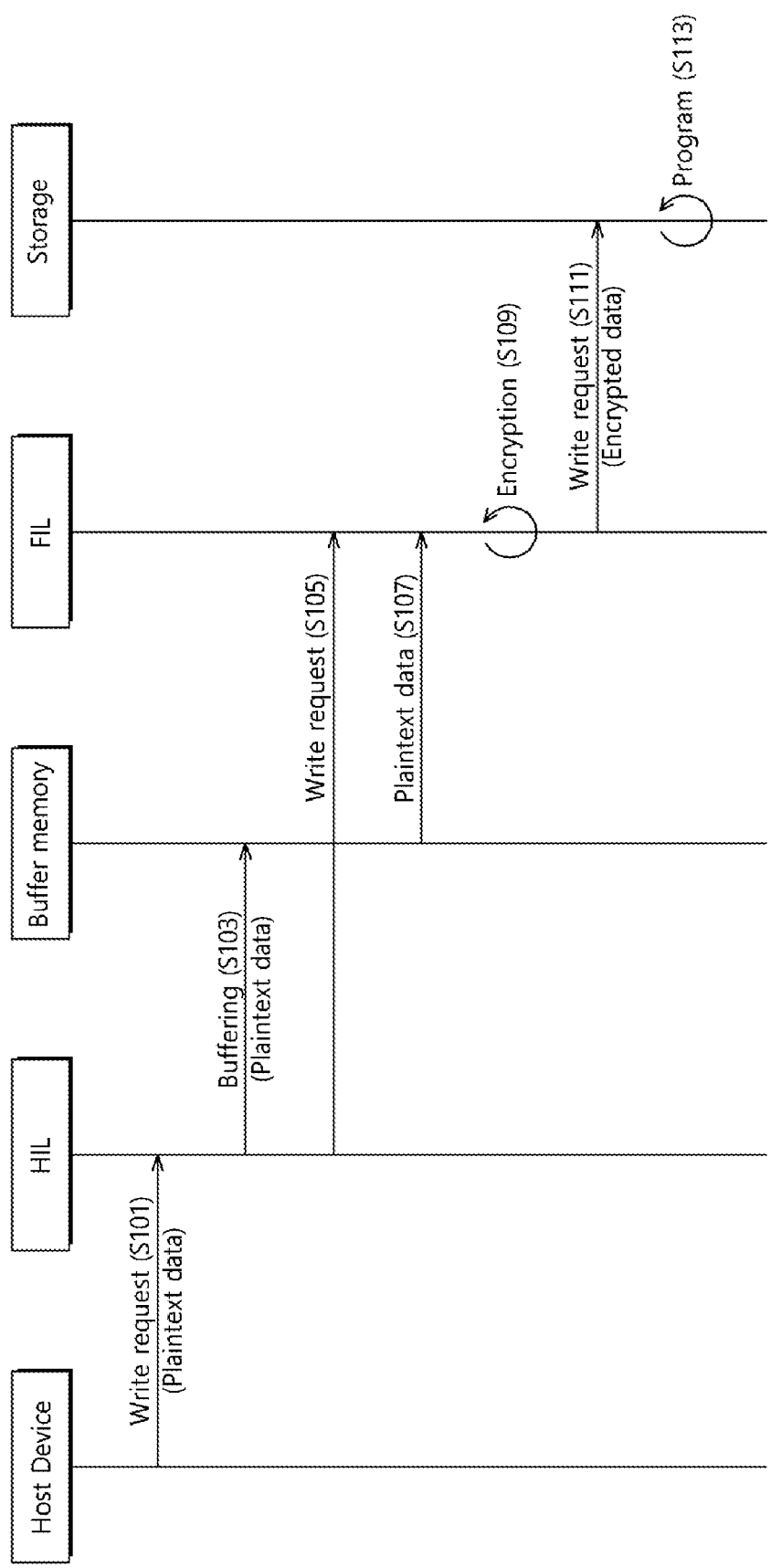
FIGS. 5 to 7 show signaling diagrams for describing methods of operating a data storage device, in accordance with embodiments.
Figure 6:
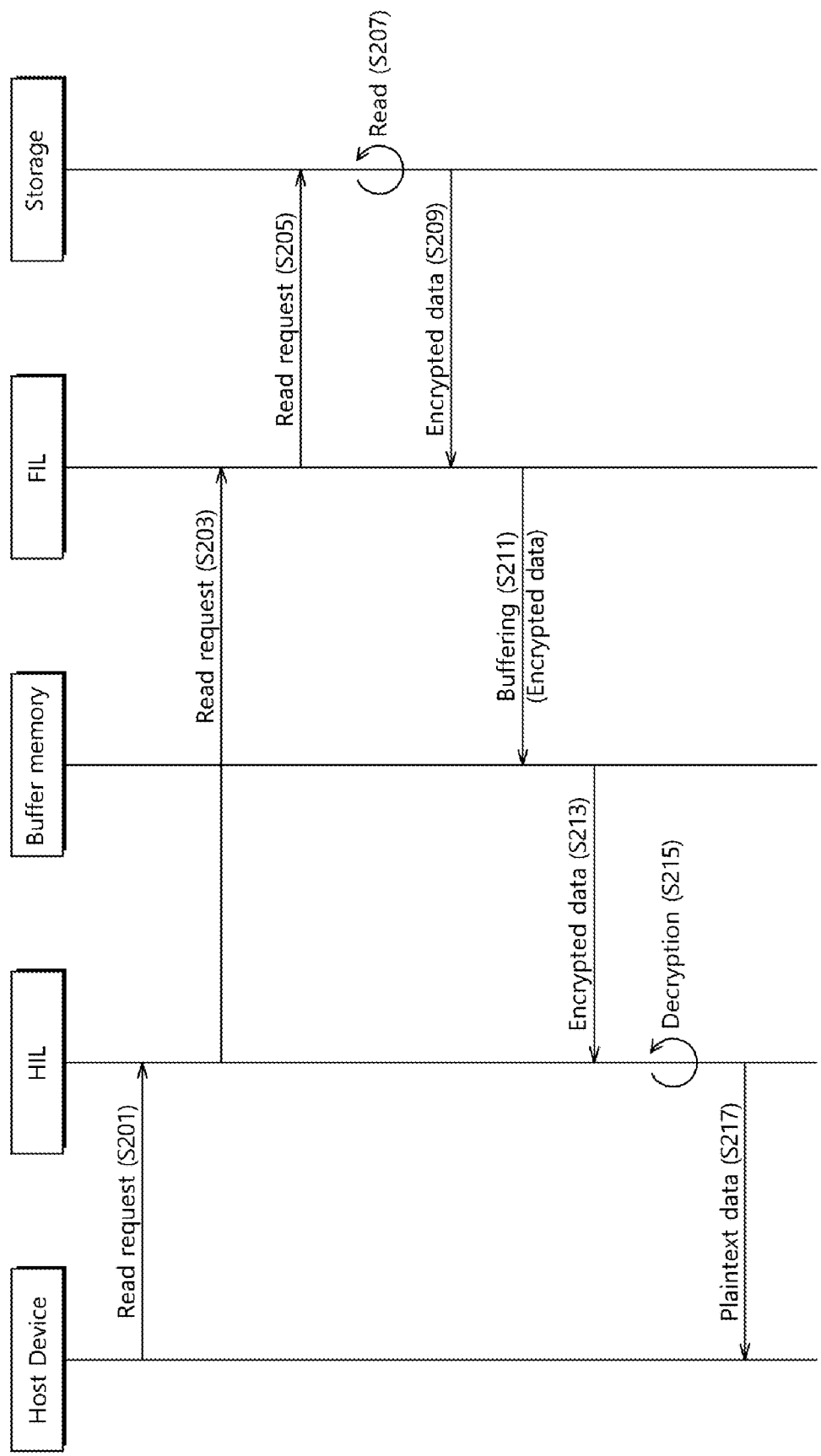
Figure 7:
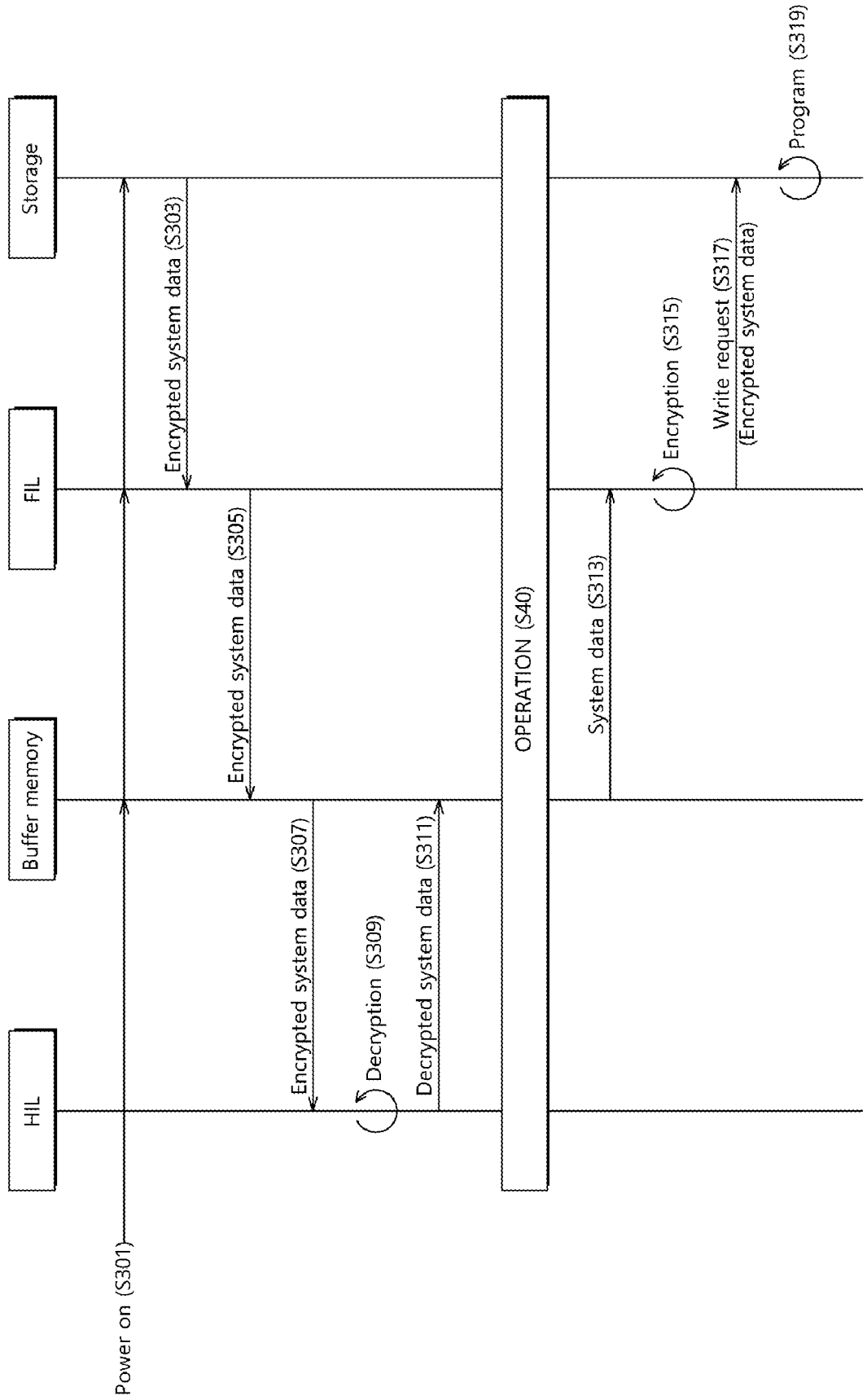

FIGS. 5 to 7 show signaling diagrams for describing methods of operating the data storage device, in accordance with embodiments.

FIG. 5 illustrates an example of a method of programming data provided from the host device to the storage 120.

Referring to FIG. 5, as the host device requests a write operation from the controller 110 (at S101), the controller 110 may perform a series of operations of storing data in the storage 120.

At S101, the host device may request the write operation by providing plaintext write data. The write data provided by the host device may be user data or system data, e.g., a firmware code, to be updated. The write data may be transmitted in a plaintext format along with address information.

The host interface controller (HIL) 113 of the controller 110 may cache the plaintext write data provided from the host device in the buffer memory 130 (at S103). In an embodiment, the host interface controller (HIL) 113 may divide the write data into chunk data on a predetermined unit basis and temporarily store the write data in the buffer memory 130, but the present disclosure is not limited thereto.

The host interface controller (HIL) 113 may request a write operation from the memory interface controller (FIL) 119 (at S105).

The memory interface controller (FIL) 119 may receive the plaintext write data from the buffer memory 130 on a chunk basis (at S107), and encrypt the plaintext write data according to an algorithm and an encryption key corresponding to the address information (at S109). In addition, the memory interface controller (FIL) 119 may transmit the encrypted write data to the storage 120 and request an operation of writing the encrypted write data from the storage 120 (at S111).

The storage 120 may receive the encrypted write data from the memory interface controller (FIL) 119 and program the encrypted write data to a memory cell corresponding to the address information (at S113).

Hence, the plaintext write data provided from the host device may be transmitted in a plaintext format to the memory interface controller 119, and encrypted in the encryption circuit 1191 in the memory interface controller 119, and then stored in the storage 120.

FIG. 6 illustrates an example of a method of providing data read from the storage to the host device.

As the host device transmits a read request along with address information to request a read operation along with address information from the host interface controller (HIL)

113 of the controller 110 (at S201), the host interface controller (HIL) 113 may transmit the address information and the read request to the memory interface controller (FIL) 119 (at S203).

The memory interface controller (FIL) 119 may transmit the address information according to the read request to the storage 120 (at S205). In response to this, the storage 120 may read data from a memory cell indicated by the corresponding address information (at S207).

The data read by the storage 120 may be data in an encrypted state. The read data may be transmitted in the encrypted state to the memory interface controller (FIL) 119 (at S209).

The memory interface controller (FIL) 119 may temporarily store the read data in the encrypted state in the buffer memory 130 (at S211).

Thereafter, the host interface controller (HIL) 113 may read the buffered read data from the buffer memory 130 (at S213) and decrypt the read data (at S215).

The plaintext read data decrypted by the host interface controller (HIL) 113 may be provided to the host device (at S217).

The data that is read in response to a request of the host device and decrypted and then provided to the host device may be user data, but the present disclosure is not limited thereto.

FIG. 7 illustrates an example of a method of reading data for an operation of the data s from the storage 120 and decrypting the data, and an example of a method of programming data self-generated in the controller 110 to the storage 120 according to an operation of the storage 120.

To operate the data storage device 10, when the data storage device 10 is driven, preset system data may be read from the storage 120 and provided to the controller 110.

Here, the system data may include firmware for managing the data storage device 10, a mapping table defining a relationship between a logical address that is managed by the host device and a physical address of a physical space constituting the storage 120, and meta data indicating a management state of the physical space constituting the storage 120.

Referring to FIG. 7, as power is supplied to the data storage device 10 (at S301), the preset system data may be outputted from the storage 120 to the memory interface controller 119 (at S303). The system data outputted at S303 may be in an encrypted state.

The encrypted system data may pass through the buffer memory 130 (at S305) and be transmitted to the host interface controller 113 (at S307). The decryption circuit 1131 in the host interface controller 113 may decrypt the system data (at S309).

The decrypted system data may be loaded into the buffer memory 130, the RAM 1153 in the controller, or other predefined storage spaces (at S311).

As the system data that has been stored in the storage 120 is decrypted and loaded along with the supply of power, the data storage device 10 may be operated in conjunction with the host device. In other words, in response of a request of the host device, data may be read/written from/to the storage 120 (at S40).

During this operation process, the map table or the meta data may be changed. This system data may be temporarily stored in a preset storage space in the buffer memory 130 or the controller 110 and thereafter safely stored in the storage 120 at a preset point in time.

In an embodiment, in the case where the data storage device 10 makes a transition to a sleep mode, the system data may be shifted to the storage 120 when the system data is system data which is infrequently used, a long time has passed after the time of access to the system data, or the system data has not been used over a predetermined period.

To flush the system data to the storage 120, the system data stored in a temporary storage space, e.g., the buffer memory 130, may be transmitted to the memory interface controller (FIL) 119 (at S313).

The encryption circuit 1191 of the memory interface controller (FIL) 119 may encrypt the plaintext system data (at S315), and transmit the encrypted system data to the storage 120 to request an operation of writing the encrypted system data from the storage 120 (at S317).

The storage 120 may receive the encrypted system data and program the encrypted system data to a corresponding area (at S319).

As such, because only when power is applied to the data storage device may the system data be looped back to the host interface controller (HIL) 113 and decrypted, the system data may be decrypted without affecting system performance.

Furthermore, before the system data is stored in the storage 120, the decryption operation may be performed in the memory interface controller (FIL) 119 without the need to loop back the system data to the host interface controller (HIL) 113.

Figure 8:
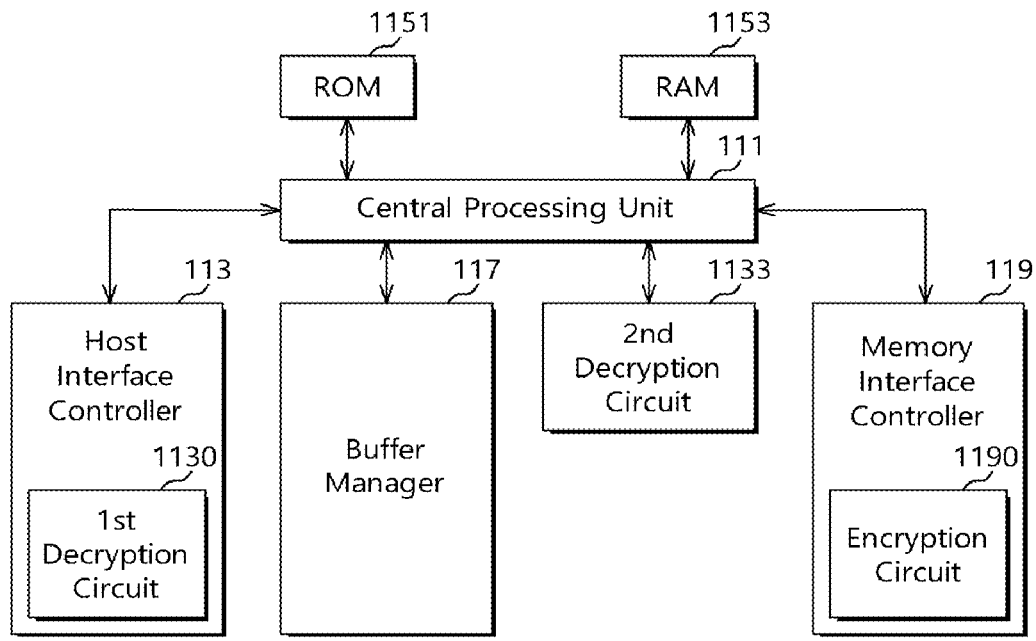
FIG. 8 shows a diagram illustrating a configuration of a controller, in accordance with an embodiment.

FIG. 8 shows a diagram illustrating a configuration of a controller 110-1, in accordance with an embodiment.

To prevent the system data from being looped back to the host interface controller (HIL) 113 during an operation of decrypting the system data, a controller may have the configuration illustrated in FIG. 8.

Referring to FIG. 8, the controller 110-1 may include a first decryption circuit 1130 and a second decryption circuit 1133.

The controller 110-1 illustrated in FIG. 8, with the exception of the configuration of the second decryption circuit 1133, may have substantially the same configuration as the controller 110 illustrated in FIGS. 1 to 3.

The second decryption circuit 1133 may be a dedicated decryption circuit 1133 for system data. Therefore, when power is applied, system data read from the storage 120 to the controller 110-1 may be decrypted by the second decryption circuit 1133 without being transmitted to the host interface controller 113. Hence, system performance may be prevented from deterioration due to the loopback operation.

As described above, in accordance with embodiments of the present disclosure, data read from a storage medium may be transmitted in an encrypted state to a host interface side, so that security may be improved.

Furthermore, during a system data storage operation or a same data batch storage (Write same) operation, data may be encrypted in a memory interface side and stored without being looped back to the host interface side.

Because performance corresponding to a bandwidth of the storage medium is required only for an encryption engine installed in the memory interface side which has a higher bandwidth than host device, the performance of the decryption engine may be optimized.

Figure 9:
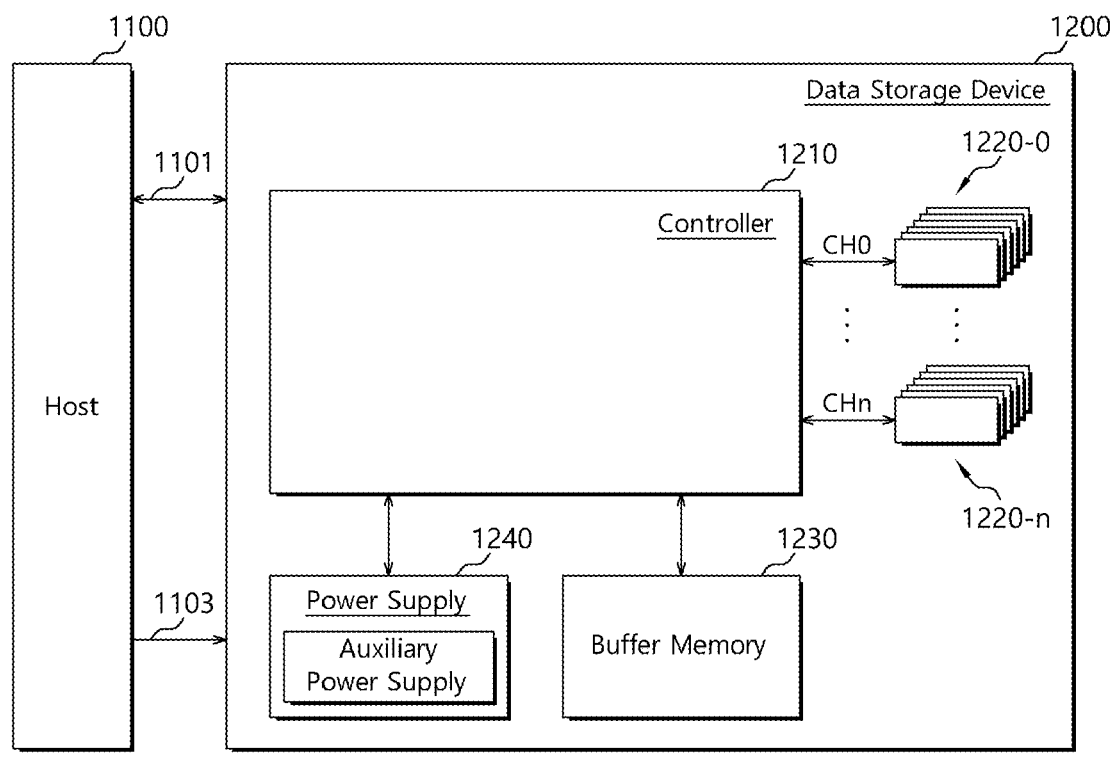
FIG. 9 shows a diagram illustrating a data storage system, in accordance with an embodiment.

FIG. 9 shows a diagram illustrating a data storage system 1000, in accordance with an embodiment.

Referring to FIG. 9, the data storage system 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface, a controller, a random access memory used as a working memory, an error correction code (ECC) circuit, and a memory interface (not shown). In an embodiment, the controller 1210 may configured by controller 110 shown in FIGS. 1, 2, and 3.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n under the control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103, to the inside of the data storage device 1200. The power supply 1240 may include an auxiliary power supply. The auxiliary power supply may supply power to allow the data storage device 1200 to be normally terminated when a sudden cut in power occurs. The auxiliary power supply may include one or more capacitors for storing charge.

The signal connector 1101 may be configured by various types of connectors depending on an interface scheme between the host device 1100 and the data storage device 1200.

The power connector 1103 may be configured by various types of connectors depending on a power supply scheme of the host device 1100.

Figure 10:
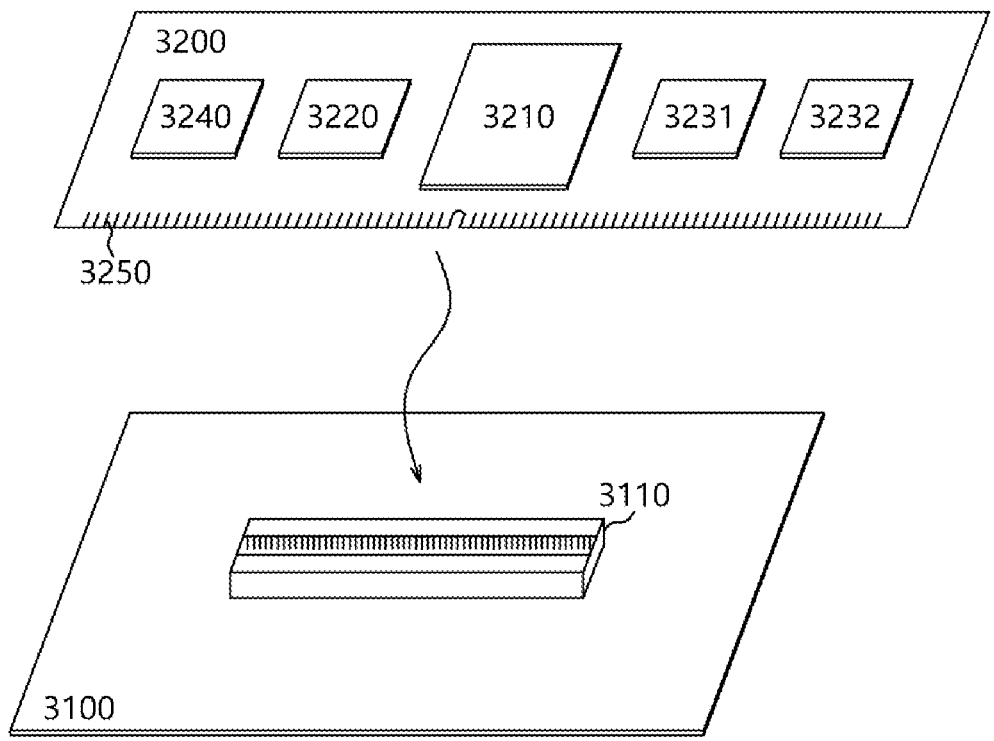
FIGS. 10 and 11 show diagrams illustrating a data processing system, in accordance with an embodiment.

FIG. 10 shows a diagram illustrating a data processing system 3000, in accordance with an embodiment. Referring to FIG. 10, the data processing system 3000 may include a host device 3100 and the memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mounted to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 to 3.

The buffer memory device 3220 may temporarily store data to be stored in the nonvolatile memory devices 3231 and 3232. Further, the buffer memory device 3220 may temporarily store the data read from the nonvolatile memory devices 3231 and 3232. The data temporarily stored in the buffer memory device 3220 may be transmitted to the host device 3100 or the nonvolatile memory devices 3231 and 3232 under the control of the controller 3210.

The nonvolatile memory devices 3231 and 3232 may be used as storage media of the memory system 3200.

The PMIC 3240 may provide the power inputted through the connection terminal 3250, to the inside of the memory system 3200. The PMIC 3240 may manage the power of the memory system 3200 under the control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be of various types depending on an interface scheme between the host device 3100 and the memory system 3200. The connection terminal 3250 may be disposed on any one side of the memory system 3200.

Figure 11:
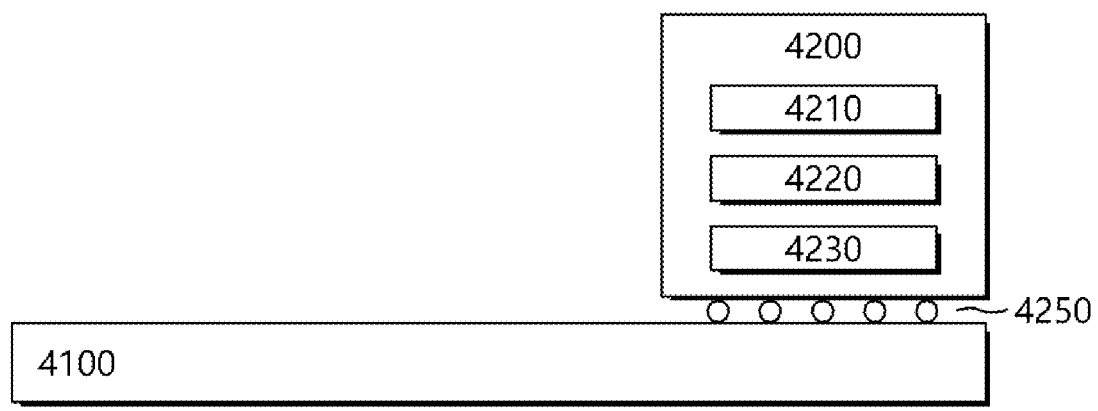

FIG. 11 shows a diagram illustrating a data processing system 4000, in accordance with an embodiment. Referring to FIG. 11, the data processing system 4000 may include a host device 4100 and the memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounting type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 to 3.

The buffer memory device 4220 may temporarily store data to be stored in the nonvolatile memory device 4230. Further, the buffer memory device 4220 may temporarily store the data read from the nonvolatile memory device 4230. The data temporarily stored in the buffer memory device 4220 may be transmitted to the host device 4100 or the nonvolatile memory device 4230 under the control of the controller 4210.

The nonvolatile memory device 4230 may be used as the storage medium of the memory system 4200.

Figure 12:
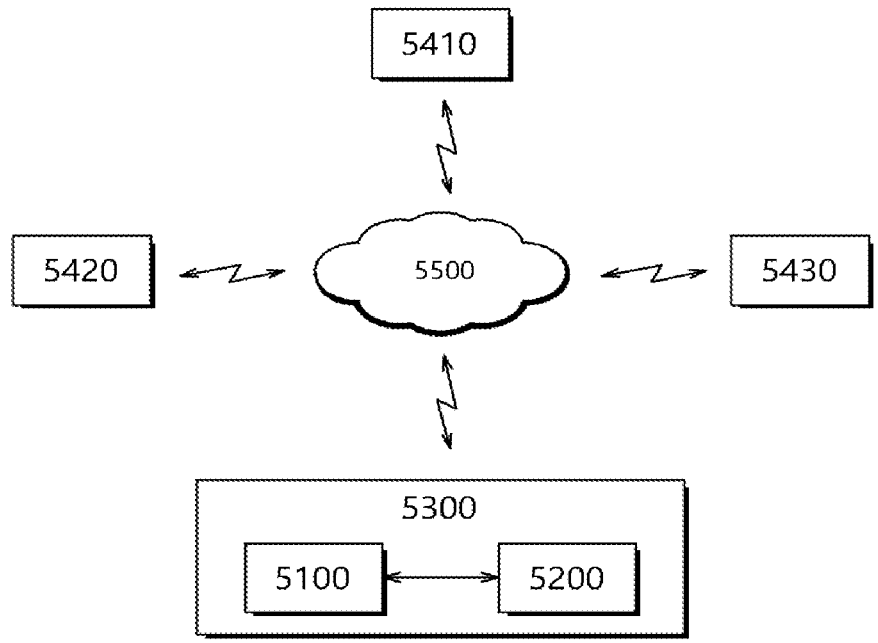
FIG. 12 shows a diagram illustrating a network system including a data storage device, in accordance with an embodiment.

FIG. 12 shows a diagram illustrating a network system 5000 including a data storage device, in accordance with an embodiment. Referring to FIG. 12, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided from the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 9, the memory system 3200 shown in FIG. 10, or the memory system 4200 shown in FIG. 11.

Figure 13:
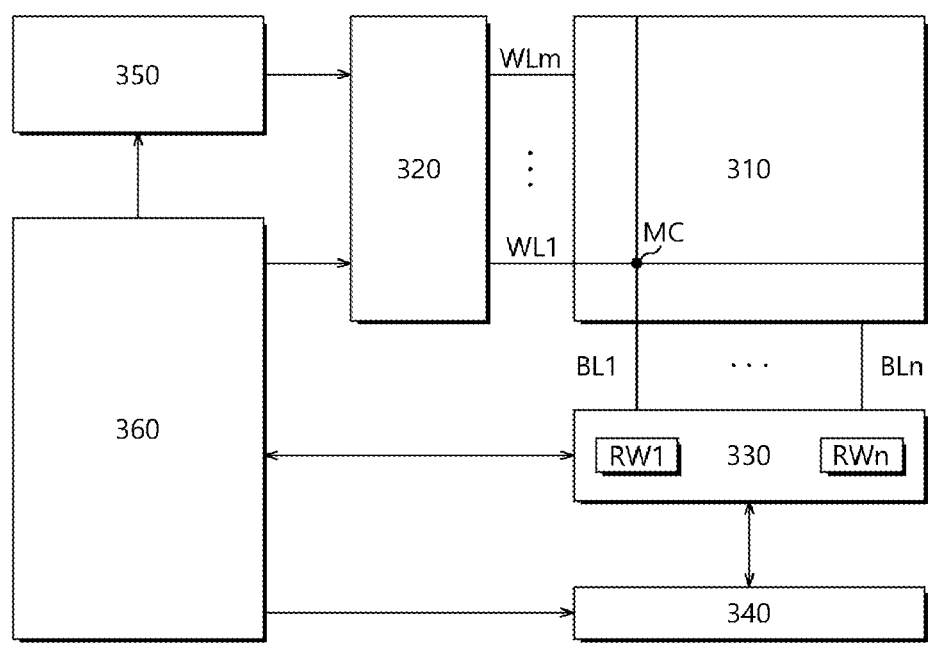
FIG. 13 shows a block diagram illustrating a nonvolatile memory device included in a data storage device, in accordance with an embodiment.

FIG. 13 shows a block diagram illustrating a nonvolatile memory device 300 included in a data storage device, in accordance with an embodiment. Referring to FIG. 13, the nonvolatile memory device 300 may include a memory cell array 310, a row decoder 320, a data read/write block 330, a column decoder 340, a voltage generator 350, and a control logic circuit 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array has a direction perpendicular to the flat surface of a semiconductor substrate. For an embodiment, a three-dimensional memory array means a structure including NAND strings in which at least one memory cell among memory cells MC is located in a vertical upper portion of the other memory cell among memory cells MC.

The structure of the three-dimensional memory array is not limited thereto. It is apparent that the memory array structure can be selectively applied to a memory array structure formed in a highly integrated manner with horizontal directionality as well as vertical directionality.

The row decoder 320 may be coupled with the memory cell array 310 through the word lines WL1 to WLm. The row decoder 320 may operate under the control of the control logic circuit 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate under the control of the control logic circuit 360. The data read/write block 330 may operate as a write driver or a sense amplifier according to an operation mode. For example, the data read/write block 330 may operate as a write driver, which stores data provided from the external device in the memory cell array 310 in a write operation. For another example, the data read/write block 330 may operate as a sense amplifier, which reads out data from the memory cell array 310 in a read operation.

The column decoder 340 may operate under the control of the control logic circuit 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic circuit 360 may control general operations of the nonvolatile memory device 300, based on control signals provided from the external device. For example, the control logic circuit 360 may control operations of the nonvolatile memory device 300 such as read, write, and erase operations of the nonvolatile memory device 300.

While various embodiments have been described above, it will be understood to those skilled in the art that the described embodiments represent only a limited number of possible examples. Accordingly, the data storage device, the operating method thereof, and the storage system including the same described herein should not be limited based on the described embodiments.

While various embodiments have been described above, it will be understood to those skilled in the art that the embodiments described are examples only. Accordingly, the data storage device, the method of operating the same, and the storage system having the same described herein should not be limited based on the described embodiments.

What is claimed is:

1. A data storage device comprising:
a storage;
a buffer memory; and
a controller, wherein the controller is configured to:
control at least one of an input of data to and an output of data from the storage in response to a request transmitted from a host device;
receive write data transmitted from the host device and cached in the buffer memory, encrypt the write data, and store the encrypted write data in the storage; and
receive read data read from the storage and cached in the buffer memory, decrypt the read data, and provide the decrypted read data to the host device,
wherein the controller comprises:
a memory interface controller comprising an encryption circuit including at least one encoder configured to encrypt the write data and to provide a communication channel between the controller and the storage; and
a host interface controller comprising a decryption circuit including at least one decoder configured to decrypt the read data and to provide a communication channel between the controller and the host device, and
a bandwidth of the encryption circuit and a bandwidth of the decryption circuit synchronize with a bandwidth of the host device when a difference between a bandwidth of the host device and a bandwidth of the storage is less than a preset reference value.

2. The data storage device according to claim 1, wherein the write data is divided on a preset chunk basis, cached in the buffer memory, and encrypted in parallel by the plurality of encoders of the encryption circuit.

3. The data storage device according to claim 1, wherein each of the at least one encoder is operated in a pipeline manner.

4. The data storage device according to claim 1,
wherein a bandwidth of the encryption circuit synchronizes with a bandwidth of the storage, and
wherein a bandwidth of the decryption circuit synchronizes with a bandwidth of the host device.

5. The data storage device according to claim 1, wherein data encrypted by the encryption circuit is buffered to a buffer in the memory interface controller and then outputted to the storage when a difference between a bandwidth of the host device and a bandwidth of the storage is greater than a preset reference value.

6. The data storage device according to claim 1, wherein the write data transmitted from the host device and cached in the buffer memory includes at least one of user data and update information of system data.

7. The data storage device according to claim 1, wherein the read data read from the storage and cached in the buffer memory includes user data and system data.

8. The data storage device according to claim 1, wherein the controller encrypts system data satisfying preset conditions among system data that change during an operation of the controller and stores the encrypted system data in the storage.

9. The data storage device according to claim 1, wherein:
the encryption circuit is configured to encrypt at least one of user data or system data that is transmitted from the host device and cached in the buffer memory; and
the decryption circuit comprises:
 a first decryption circuit including at least one decoder configured to decrypt at least one of user data or system data that is read from the storage and cached in the buffer memory; and
 a second decryption circuit including at least one decoder configured to decrypt system data that is read from the storage and cached in the buffer memory.

10. A data storage device comprising:
a storage;
a buffer memory; and
a controller, wherein the controller is configured to:
allow plaintext write data to be cached in a plaintext format in the buffer memory through a host device, receive the plaintext write data from the buffer memory, and encrypt the plaintext write data; and
allow read data to be cached in an encrypted state in the buffer memory through the storage, receive the encrypted read data from the buffer memory, decrypt the encrypted read data, and transmit the decrypted read data to the host device,
wherein the controller comprises:
 a memory interface controller comprising an encryption circuit including at least one encoder configured to encrypt the plaintext write data, the memory interface controller providing a communication channel between the controller and the storage; and
 a host interface controller comprising a decryption circuit including at least one decoder configured to decrypt the encrypted read data, the host interface controller providing a communication channel between the controller and the host device, and
 a bandwidth of the encryption circuit and a bandwidth of the decryption circuit synchronize with a bandwidth of the host device when a difference between a bandwidth of the host device and a bandwidth of the storage is less than a preset reference value.

11. The data storage device according to claim 10,
wherein a bandwidth of the encryption circuit synchronizes with a bandwidth of the storage, and
wherein a bandwidth of the decryption circuit synchronizes with a bandwidth of the host device.

12. The data storage device according to claim 10, wherein:
the encryption circuit is configured to encrypt at least one of plaintext user data or plaintext system data that is transmitted from the host device and cached in the buffer memory; and
the decryption circuit comprises:
 a first decryption circuit including at least one decoder configured to decrypt at least one of encrypted user data or encrypted system data that is read from the storage and cached in the buffer memory; and
 a second decryption circuit including at least one decoder configured to decrypt encrypted system data that is read from the storage and cached in the buffer memory.

13. A method of operating a data storage device including a storage, a buffer memory, and a controller, wherein the controller is configured to comprise a memory interface controller comprising an encryption circuit including at least one encoder and a host interface controller comprising a decryption circuit including at least one decoder and control at least one of an input of data to and an output of data from the storage in response to a request transmitted from a host device, the method comprising:
receiving, by the memory interface controller configured to provide a communication channel between the controller and the storage, write data transmitted from the host device and cached in the buffer memory, encrypting the write data, and storing the encrypted write data in the storage;
receiving, by the host interface controller configured to provide a communication channel between the controller and the host device, read data read from the storage and cached in the buffer memory, decrypting the read data, and providing the decrypted read data to the host device, and
synchronizing a bandwidth of the encryption circuit and a bandwidth of the decryption circuit with a bandwidth of the host device when a difference between a bandwidth of the host device and a bandwidth of the storage is less than a preset reference value.

14. The method according to claim 13,
wherein the encryption circuit encrypts the write data immediately before the write data is stored in the storage, and the decryption circuit decrypts the read data immediately before the read data is transmitted to the host device.

15. The method according to claim 13,
wherein a bandwidth of the encryption circuit synchronizes with a bandwidth of the storage, and
wherein a bandwidth of the decryption circuit synchronizes with a bandwidth of the host device.

16. The method according to claim 13, further comprising encrypting, by the memory interface controller, system data satisfying preset conditions among system data that change during an operation of the controller and storing the encrypted system data in the storage.

17. The method according to claim 16, wherein:

the encryption circuit is configured to encrypt at least one of user data and system data that is transmitted from the host device and cached in the buffer memory; and the decryption circuit comprises:
- a first decryption circuit including at least one decoder configured to decrypt at least one of user data and system data that is read from the storage and cached in the buffer memory; and
- a second decryption circuit including at least one decoder configured to decrypt system data that is read from the storage and cached in the buffer memory,
- the method further comprising decrypting, by the second decryption circuit, the system data as power is supplied to the data storage device.

18. A data storage system comprising:

a host device; and a data storage device including a storage, a buffer memory, and a controller, wherein the controller is configured to control at least one of an input of data to and an output of data from the storage in response to a request transmitted from the host device, wherein the controller:

receives write data transmitted from the host device and cached in the buffer memory, encrypts the write data, and stores the encrypted write data in the storage; and receives read data read from the storage and cached in the buffer memory, decrypts the read data, and provides the decrypted read data to the host device, wherein the controller comprises:

a memory interface controller comprising an encryption circuit including at least one encoder configured to encrypt the write data, the memory interface controller providing a communication channel between the controller and the storage; and a host interface controller comprising a decryption circuit including at least one decoder configured to decrypt the read data, the host interface controller providing a communication channel between the controller and the host device, and a bandwidth of the encryption circuit and a bandwidth of the decryption circuit synchronize with a bandwidth of the host device when a difference between a bandwidth of the host device and a bandwidth of the storage is less than a preset reference value.

19. The data storage system according to claim 18, wherein a bandwidth of the encryption circuit synchronizes with a bandwidth of the storage, and wherein a bandwidth of the decryption circuit synchronizes with a bandwidth of the host device.

20. The data storage system according to claim 18, wherein:

the encryption circuit is configured to encrypt at least one of user data and system data that is transmitted from the host device and cached in the buffer memory; and the decryption circuit comprises:
- a first decryption circuit including at least one decoder configured to decrypt at least one of user data and system data that is read from the storage and cached in the buffer memory; and
- a second decryption circuit including at least one decoder configured to decrypt system data that is read from the storage and cached in the buffer memory.

* * * * *